United States Patent [19]

Clerc

[11] Patent Number: 4,841,294

[45] Date of Patent: Jun. 20, 1989

[54] ACTIVE MATRIX DISPLAY SCREEN PERMITTING THE DISPLAY OF GRAY LEVELS

[75] Inventor: Jean-Frédéric Clerc, Saint-Egreve, France

[73] Assignee: Commissariat A L'Energie Atomique, Paris, France

[21] Appl. No.: 15,369

[22] Filed: Feb. 17, 1987

[30] Foreign Application Priority Data

Feb. 17, 1986 [FR] France ................................. 86 02103

[51] Int. Cl.[4] ............................................. G09G 3/20
[52] U.S. Cl. ................................. 340/793; 340/805
[58] Field of Search ...................... 340/793, 767, 805; 358/230, 236, 241

[56] References Cited

U.S. PATENT DOCUMENTS

| | | | |
|---|---|---|---|
| 4,087,792 | 5/1978 | Asars | 340/793 |
| 4,100,579 | 7/1978 | Ernstoff | 340/793 |
| 4,193,095 | 3/1980 | Mizushima | 340/793 |
| 4,427,978 | 1/1984 | Williams | 340/793 |
| 4,427,979 | 1/1984 | Clerc et al. | 340/793 |
| 4,554,539 | 11/1985 | Graves | 340/805 |
| 4,635,127 | 1/1987 | Togashi | 358/236 |

*Primary Examiner*—Donald J. Yusko
*Assistant Examiner*—Jeffery A. Brier
*Attorney, Agent, or Firm*—Oblon, Spivak, McClelland, Maier & Neustadt

[57] ABSTRACT

A single signal is produced, which includes a pedestal and a ramp. This signal is supplied to a column control circuit which transmits the voltage to each column for a time which can assume a number of discrete values between $t_1$, the pedestal duration, and $T_L$, the addressing time of one row. For $t_1$, the black level is obtained, for $T_L$ the white level and between them, various gray levels.

3 Claims, 8 Drawing Sheets

ACTIVE MATRIX DISPLAY SCREEN PERMITTING THE DISPLAY OF GRAY LEVELS

BACKGROUND OF THE INVENTION

The present invention relates to an active matrix display screen permitting the display of gray levels.

An active matrix display screen is diagrammatically shown in FIG. 1 and comprises a first wall 10 on which are deposited a matrix of N by P electrodes 12 forming first capacitor plates or coating, N addressing rows 14 and P addressing column 16, NP control transistors 18 each having a drain, a gate and a source, the drain of each transistor being connected to the plate 12 of one of the capacitors, the source to one of the columns 16 and the gate to one of the rows 14; a second wall 20 on which is deposited a counterelectrode 22 forming the second plate or coating of the capacitors; a first row control circuit 30 able to successively apply to the N rows 14 a voltage $V_L$ able to make the transistors of each row conductive for a time $T_L$, the control of the N rows constituting a frame of duration $Tr = NT_L$; a second control circuit 32 able to apply to the counterelectrode 22 a voltage Vce successively assuming two values, a value 0 and a value Vc, the voltage Vce passing from one to the other of these values, either after each frame, or after each row; and a third column control circuit 34 able to apply a set of P voltages to the columns 16 throughout the control time of a row.

FIG. 2 shows a detail of a display point. It is possible to see an addressing row Li, An addressing column Cj, a transistor Tij having a gate G, a source S and a drain D and finally a conductor block Cij. Source S is connected to column Cj, a gate G to row Li and drain D to block Cij.

For controlling a display point corresponding to plate Cij, transistor Tij is opened for a time $T_L$. A potential difference between column Cj linked with source S of Tij and counterelectrode 22 brings about a charge flow into the transistor channel. These charges are stored on drain D, i.e. finally on plate Cij and, symmetrically, on the counterelectrode. Following the row addressing time, transistor Tij is made non-conductive. The charge Qij stored in the capacitor remains there and a voltage Vij is permanently applied to the display material, i.e. to the liquid crystal. This voltage is equal to Qij/Kij, if Kij designates the capacitance of the display point.

If it is wished to display a gray level, it is necessary to give this ratio a value between 0 and a value Vmax corresponding to a saturated state (white).

Two solutions are known in the prior art for displaying such gray levels. The first is illustrated in FIG. 3. In the latter and in the following drawings, the time is broken up into row addressing intervals of duration $T_L$ and, for simplification purposes, it is assumed that the screen contains 5 rows $L_1, L_2 \ldots L_5$. The scan of these 5 rows constitutes a first frame and the scan of the 5 following rows a second frame.

Part a of FIG. 3 shows the voltage Vcj applied to a random volume of rank j. This voltage is shown in broken line form. It is also possible to see the voltage VCe applied to the counterelectrode (in continuous line form). The latter is 0 for the first frame and then equal to Vmax during the second. The voltage applied to a column varies between 0 and Vmax, in accordance with a voltage scale. The resulting voltage applied to the display point located on column j is equal to the difference VCj-VCe, which corresponds to the hatched area. It can be seen that said voltage has a mean value 0, because of the alternation at each frame (to prevent charge accumulation phenomena which might damage the liquid crystal).

With respect to the voltage Vij appearing on a given display point, e.g., on the second row and the jth column, it varies as shown in part b. During the interval when the second line is addressed, the voltage increases up to a value Vgr and then when the line is no longer addressed, the voltage remains at this value.

The advantage of this method is that by using relatively conductive transistors, at the end of the row addressing time, voltage Vij reaches level Vgr corresponding to the gray to be displayed and this voltage is not dependent on the value of the transistor drain current. The gray levels will then be reproduced on the screen with the same brightness level for all points.

However, the disadvantage of this method is that it makes it necessary to produce a large number of voltages Vgr (the same number as gray levels are desired), which makes the control circuit very complex.

There is another gray display control method, which is illustrated in FIG. 4. In part a, it is possible to see in continuous line form, the voltage Vce applied to the counterelectrode and in broken line form the voltage VCj applied to a column of rank j during the various row control intervals. It can be seen that the display time of a point is subdivided into two intervals and during the first, of duration $t_1$, the column is brought to the same potential as the counter electrode, whereas during the second it is brought to a voltage Vmax. Moreover, use is made of limited conduction transistors, so that the voltage Vij (shown in part b) does not reach the maximum value Vmax, if interval $t_2$ is below the total addressing interval of a row $T_L$.

The advantage of the second solution compared with the first, is that it only requires two voltage levels for the control of the rows, namely 0 and Vmax. Its disadvantage is that the voltage finally reached is dependent on the drain current of the controlled transistor. However, this current is in fact difficult to control for technological reasons, so that the reproduction on a screen of the same brightness at several points and for a same gray level is difficult to obtain.

SUMMARY OF THE INVENTION

The object of the present invention is to make the visual effect independent or only slightly dependent on dispersions of characteristics of the transistors, whilst leading to very simple control circuits. Therefore the invention recommends the use of a circuit which supplies a single voltage having a pedestal and a ramp (and no longer a voltages scale as in the first prior art method, or two voltage scales as in the second), said voltage being applied to column control circuits, which transmit it for a time which can assume various discrete values. These control circuits can be very simply obtained, e.g. by means of a single transistor. With the solution according to the invention, the levels displayed are not sensitive to the dispersions of the characteristics of the transistors, because the voltage applied to the display material is made independent of the drain current of the transistors. This property is of interest particularly for large panels, because it permits a dispersion of the characteristics of the transistors between e.g. the center of the screen and its periphery. Therefore it increases the manufacturing tolerances of large area screens.

More specifically the present invention relates to a display screen of the type described hereinbefore in connection with FIG. 1 and which is characterized in that the third column control circuit comprises a circuit supplying a voltage Vcb which, for a duration $t_1$, has a value equal to the voltage Vce applied to the counterelectrode and for a duration $t_2$ a ramp-like voltage varying linearly between said voltage Vce and a voltage differing from Vce by a quantity Vc, the total duration $t_1+t_2$ of the voltage Vcb being equal to the control duration $T_L$ of one row; column control circuits connected between said circuit and each column and which transmit to each column said voltage Scb for a time which can assume a series of discrete values between $t_1$, in which case a black display is obtained, and $T_L$, in which case a white display is obtained, each intermediate discrete value between $t_1$ and $T_L$ corresponding to a gray display.

Preferably, the control circuits of the columns connected between the circuit producing Vcb and each column are constituted by P transistors having a source connected to the circuits applying the voltage Vcb, A drain connected to one of the P columns and a gate connected to a means able to supply a transistor opening control voltage for a time which is a function of the gray level to be displayed.

Preferably, the means able to supply an opening control voltage for the P transistors is constituted by P shift registers of n cells each, the first cell of each register being connected to the gate of one of the transistors, one register containing n bits, whereof the first is always equal to 1 and the following ones are equal to 0 or to 1, all these n bits characterising a gray level. These registers are controlled by a common clock of period $t_1$, which controls the shift of the bits in each register. Duration $t_1$ is such that $nt_1$ is equal to the total control time $T_L$ of a row.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 5:
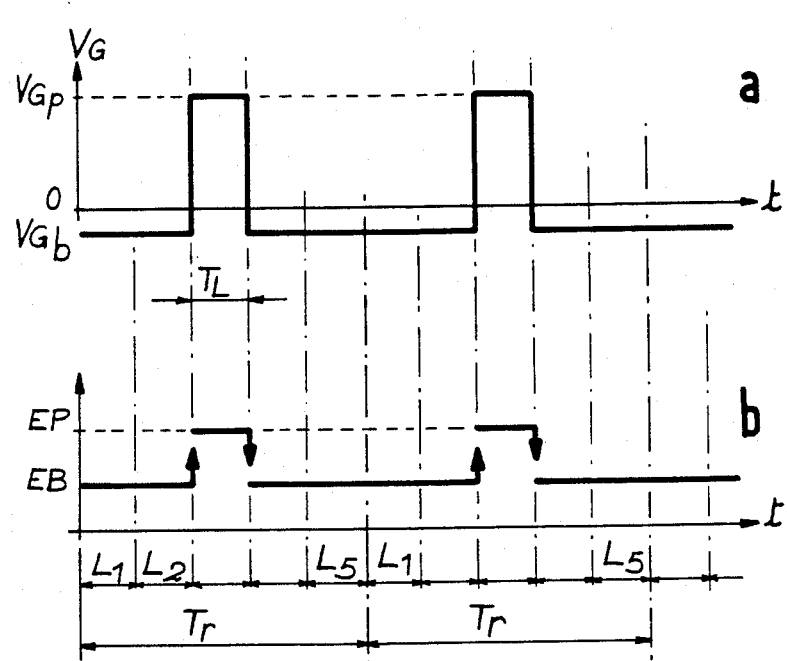
FIG. 5, an example for the control of the transistors of the same row.

Part a of FIG. 5 shows the voltage VG applied to a particular row (e.g. the third row) i.e. definitively the voltage applied to the gates of transistors connected to said row. This voltage is either equal to VGb, which corresponds to an off state of the transistor, or to VGb corresponding to an on state of said transistor. In part b of FIG. 5, the on state is designated EP and the off state EB. The vertical arrows show the passage of the transistors from one state to the other. It is pointed out that this addressing mode is not unique to the invention, but is already used in the prior art.

Figure 6:
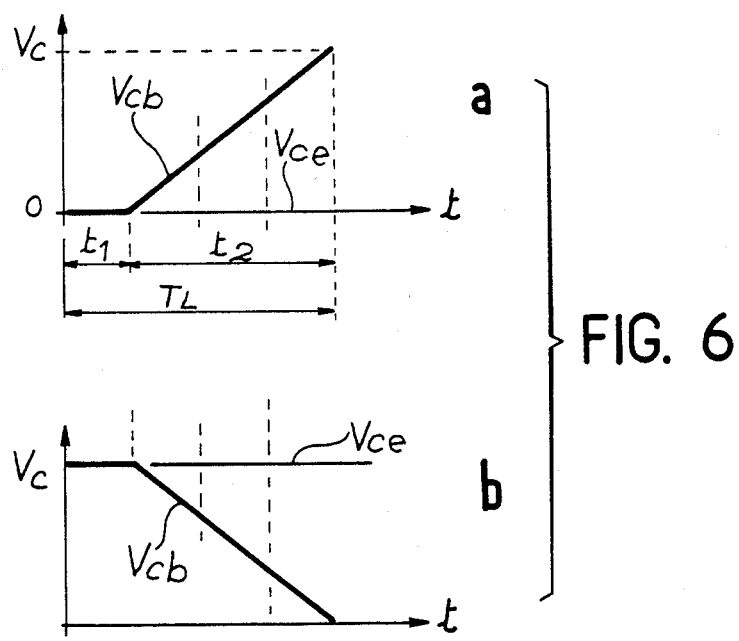
FIG. 6, the shape of the single voltage produced according to the invention.

However, what is specific to the invention is the single voltage produced for controlling the display. This single voltage is shown in FIG. 6. The two shapes a and b correspond to the two cases of an even frame and an uneven frame, on alternating the voltage of the counterelectrode Vce after each frame, or by a even row and an uneven row on alternating Vce after each row. The single voltage Vcb is formed from a pedestal of duration $t_1$ having a value equal to the voltage of the counterelectrode Vce (i.e. 0 in the case a and Vc in case b) and a linear ramp of duration $t_2$, which passes the voltage from the preceding value to a value differing from Vce by a quantity Vc (i.e. which reaches Vc in case a and 0 in case b). The total duration $t_1+t_2$ is equal to the control duration $T_L$ of a row.

Figure 14:
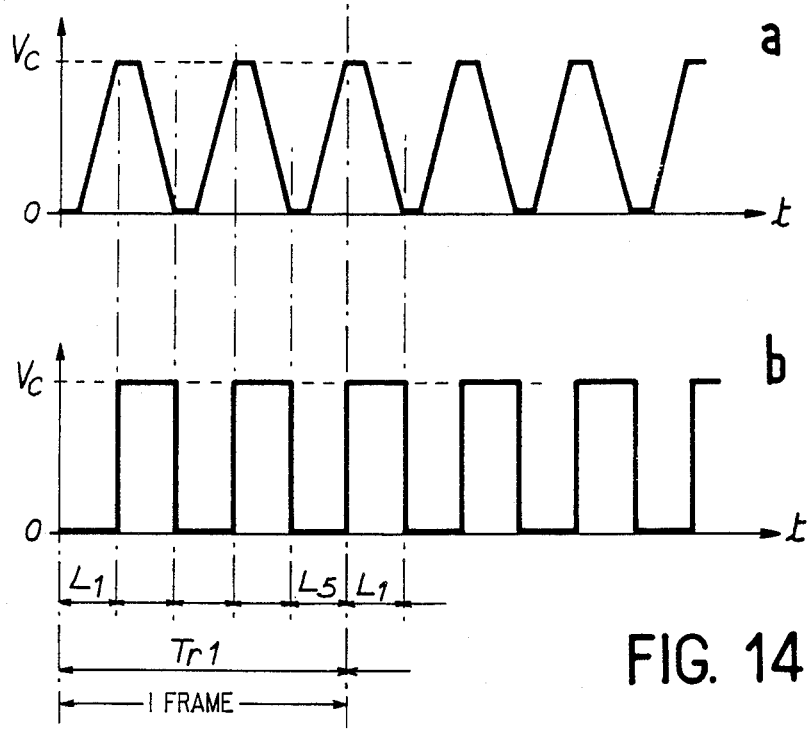
FIG. 14, a variant corresponding to the case of an alternation after each row and no longer after each frame.

In FIGS. 7 to 11, it is assumed that the polarity alternation takes place after each frame. FIG. 14 illustrates the case where the alternation takes place after each row.

Figure 7:
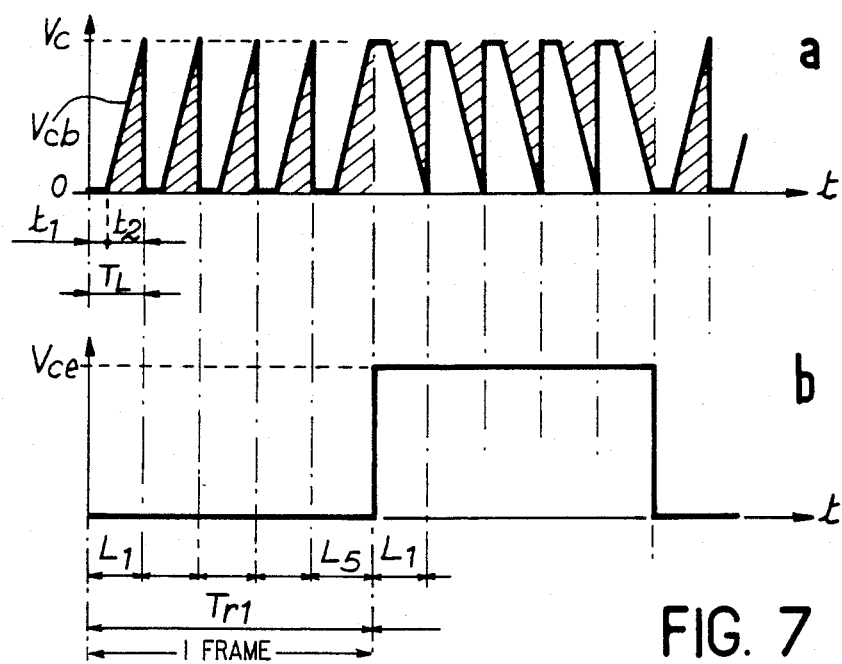
FIG. 7, the voltages applied in order to obtain a white level.

FIG. 7 shows in part a the single voltage Vcb during various row scans (it still being assumed that a frame is formed from five row scans) and in part b the counter -electrode voltage Vce and its alternation at each frame. Thus, the voltage ramp Vcb has a positive slope for one frame (which corresponds to the signal of FIG. 6a) and a negative slope for the following frame (which corresponds to the signal of FIG. 6b).

On now considering a particular column, it is necessary to determine the interval during which said single voltage will be applied to the column. This time is determined by control circuits which, as will be shown hereinafter, can be transistors brought into the on or off state. In FIGS. 8 to 11, these states are represented in part b by an on state EP and an off state EB.

Figure 8:
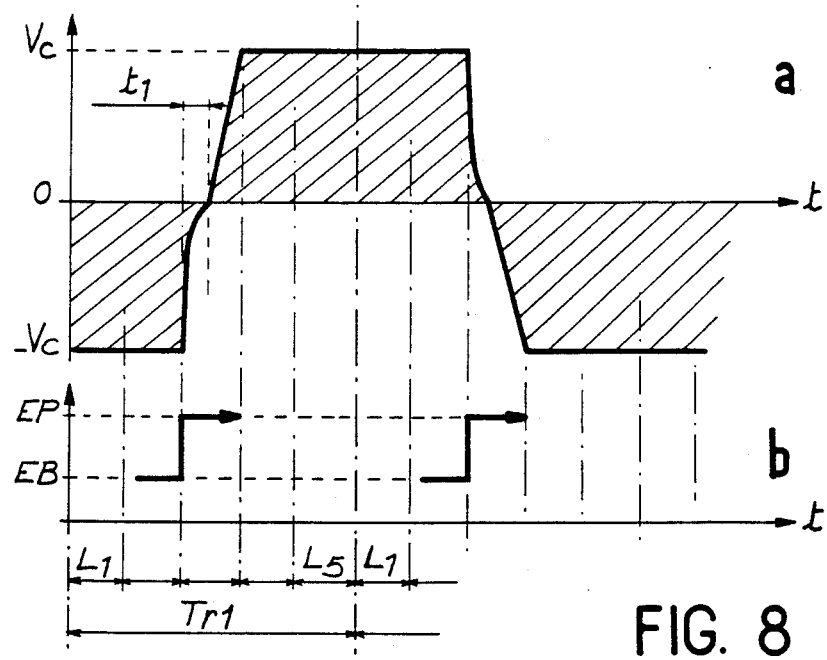
FIG. 8, the voltage applied to the display point and the state of the control circuits in the case of a white control.

Interest is attached in FIG. 8 to a point located on the third row and on a random column, it being assumed that the white is to be displayed on this point. The column control circuit must therefore be on for the complete duration $T_L$. For the pedestal of duration $t_1$, the control circuit is on, the capacitor discharges and the voltage drops to 0. Then the control circuit remains on, the voltage follows the ramp and reaches $+Vc$ or $-Vc$ and so on, so that a white display is obtained.

Figure 9:
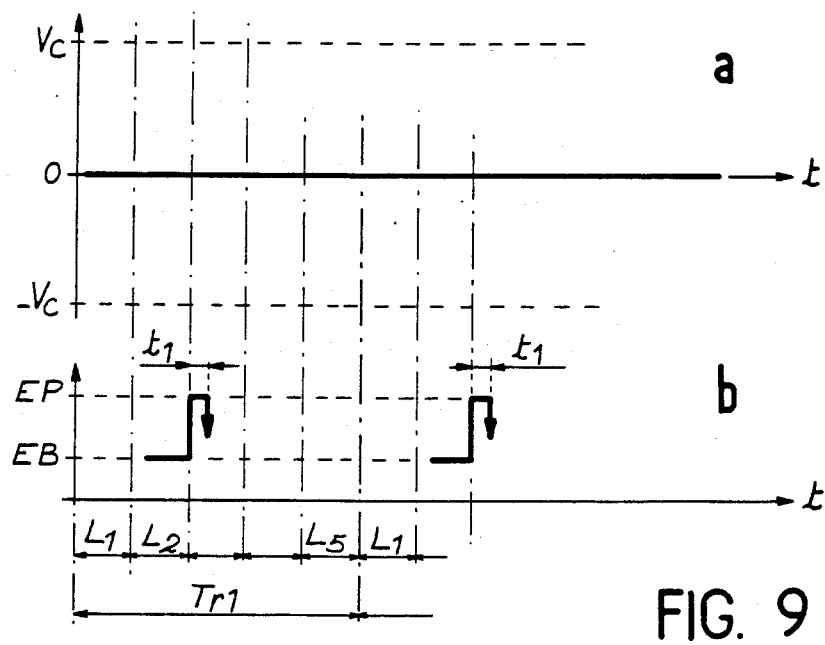
FIG. 9, the voltage applied in the case of a black display.

FIG. 9 corresponds to the display of a black point. The control circuit is only conductive or on for the time interval $t_1$, i.e. when Vcb is equal to Vce. In other words, no potential difference is applied between the capacitor plates at the intersection of the considered column and the third row.

Figure 10:
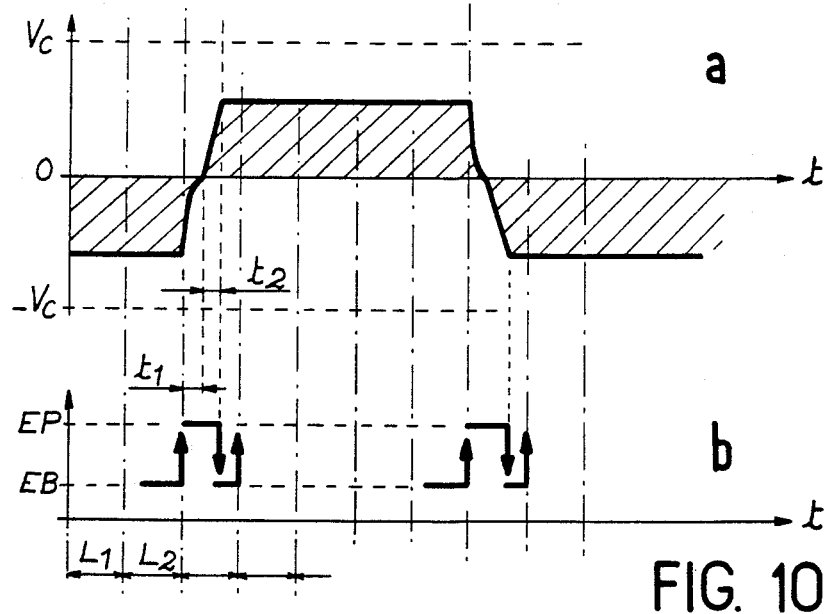
FIG. 10, the evolution of the voltage applied to a display point for a given gray level and the state of the corresponding control circuits.

FIG. 10 illustrates an intermediate state, where it is wished to display a gray level. In this case, the column control circuit is open not only for the pedestal of duration $t_1$ (but also for a time $t_2$ corresponding to the voltage ramp). This value $t_2$ is still limited and does not reach the value $T_L - t_1$, as in the white display case. Thus, the voltage applied starts by dropping to a 0 value (which corresponds to the pedestal $t_1$) and then follows part of the ramp of signal Vcb (corresponding to interval $t_2$). This intermediate voltage level reached corresponds to a gray level.

Figure 11:
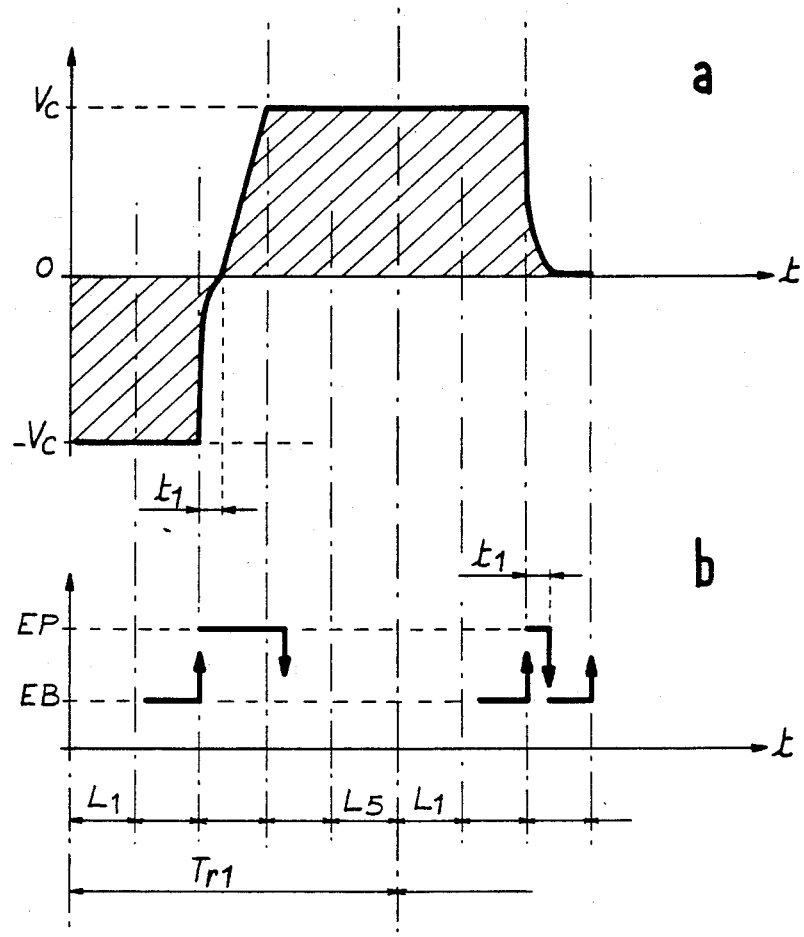
FIG. 11, an example of writing a white level followed by the writing of a black level.

FIG. 11 shows how one passes from a white display to a black display. On the first frame, the column control circuit is on for the complete row addressing period. Thus, at the end of row scanning, the voltage applied reaches the voltage Vc corresponding to the white level. At the following frame, the control circuit is on for the duration $t_1$, which corresponds to the pedestal where the voltage applied is 0 and which brings about the discharge of the capacitor. However, this circuit is off or non-conductive immediately thereafter, which prevents the voltage from leaving the value 0, so that the displayed point remains at the black level.

Figure 12:
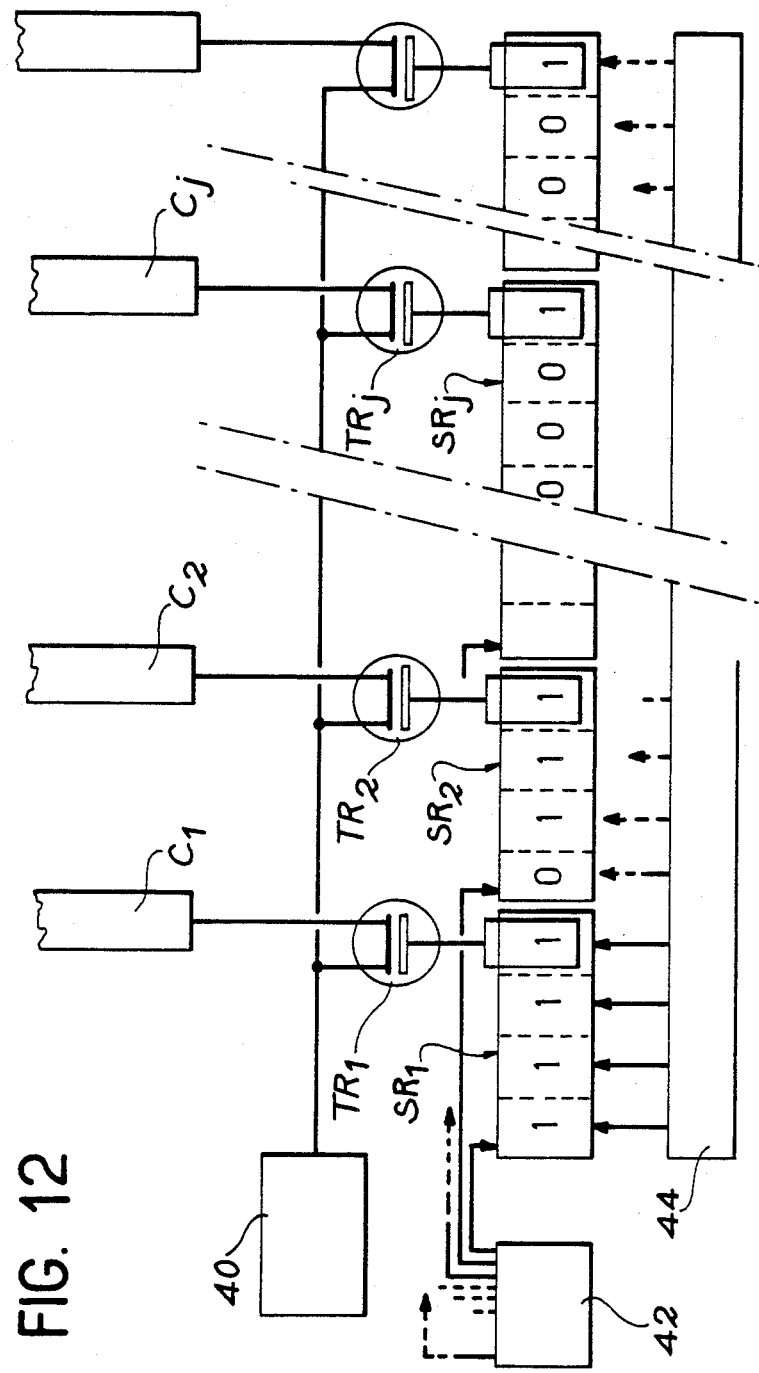
FIG. 12, an embodiment of the column control circuits according to the invention using transistors.
Figure 13:
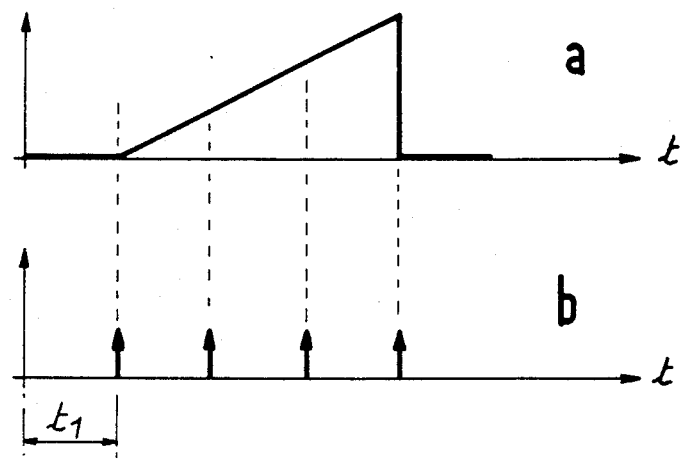
FIG. 13, the ramp-shaped voltage applied to the sources of all the transistors and the clock pulses controlling the shift registers.

FIG. 12 shows an embodiment of the construction of the column control circuits, which are constituted by transistors TR1, TR2....TRj having a source connected to a circuit 40, which supplies the single voltage, as illustrated in FIG. 6, as well as a drain connected to a column. For controlling the opening and closing of these transistors, use can be made of shift registers SR1, SR2. ...SRj, whereof the first cell is connected to the gate of each of the transistors TR1, TR2....TRj. All these registers are controlled by a single clock 42, which emits periodic pulses separated by a time interval equal to $t_1$. FIG. 13 shows the voltage supplied by the circuit 40 (a) and the clock pulses (b).

In the illustrated case, the shift registers comprise 4 cells, because the duration $T_L$ is equal to $4t_1$. The cells are loaded by 1 or by 0, as a function of the display to be performed. The first cell is certainly loaded by a 1. The transistors TRj are always on for time $t_1$. For displaying a white level, the register is loaded with the sequence 1111. The corresponding transistor is open over the entire pedestal and the ramp following the 4 clock pulses (which corresponds to the case illustrated in FIG. 8). For displaying a light gray level, the register is loaded with the sequence 0111, which corresponds to an interval $t_2$ open for $2t_1$ (which corresponds to the example illustrated in FIG. 10). For a dark gray, use will be made of the sequence 0011 and for the black the sequence 0001. Thus, for the latter case, the transistor will only be opened for the pedestal $t_1$ (which corresponds to the example illustrated in FIG. 9).

Circuit 44 is used for loading the shift registers as a function of the display to be performed on the various columns. Each value is coded in accordance with one of the aforementioned 4 sequences and the loading takes place at each row control.

Figure 1:
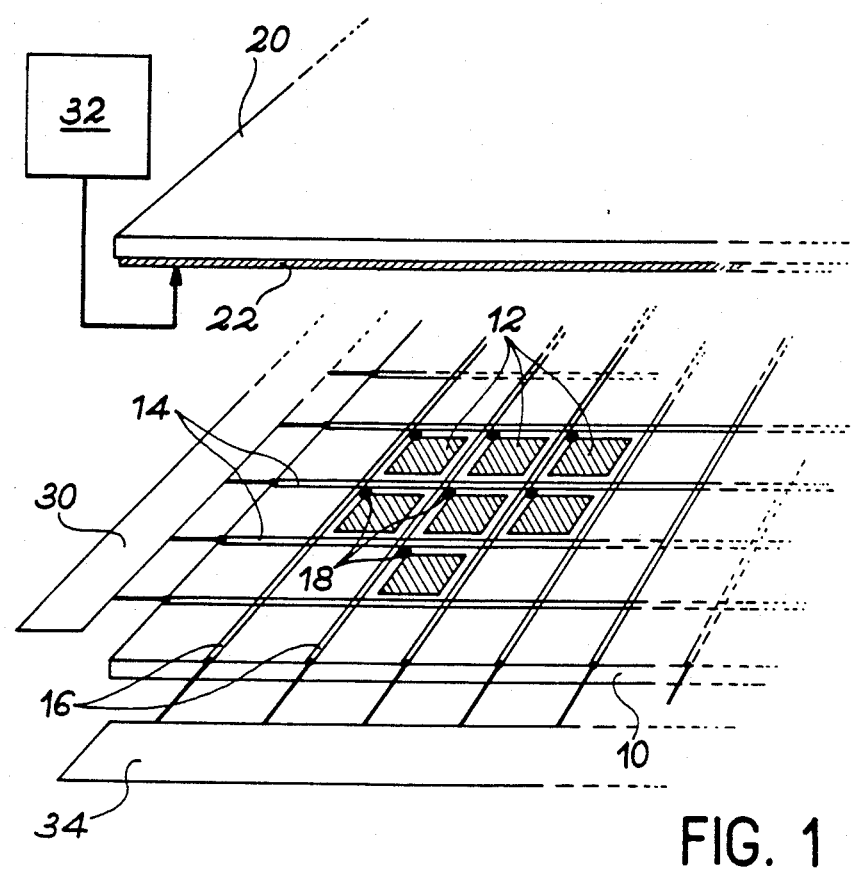
FIG. 1, already described, a prior art screen.
Figure 2:
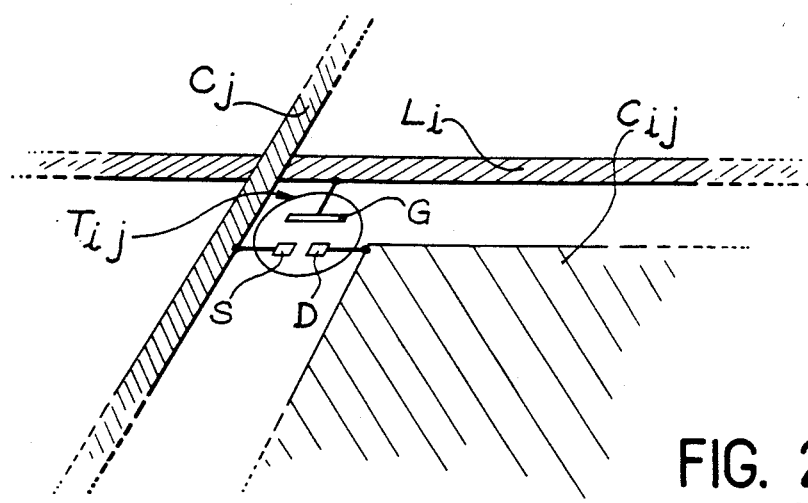
FIG. 2, already described, a detail of such a screen.
Figure 3:
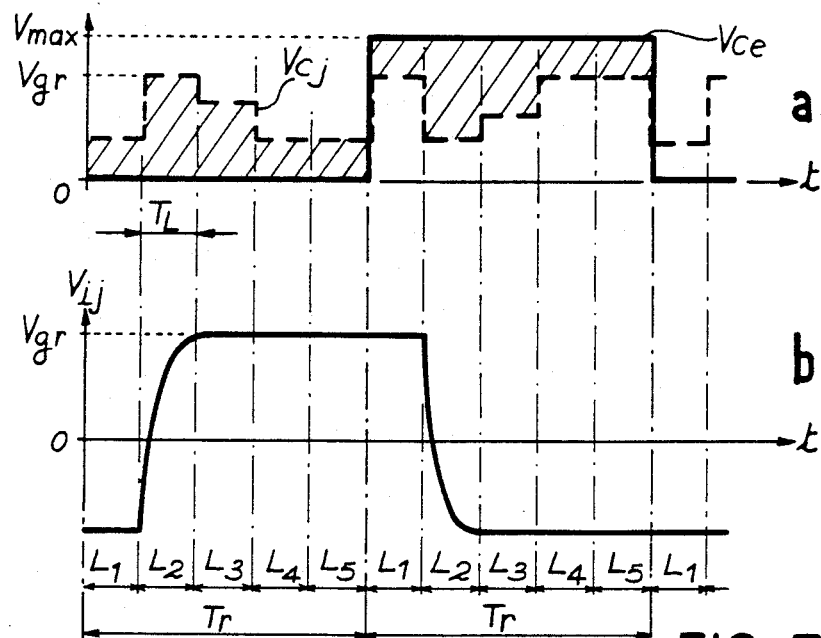
FIG. 3, already described, a first known variant for the control of gray levels.
Figure 4:
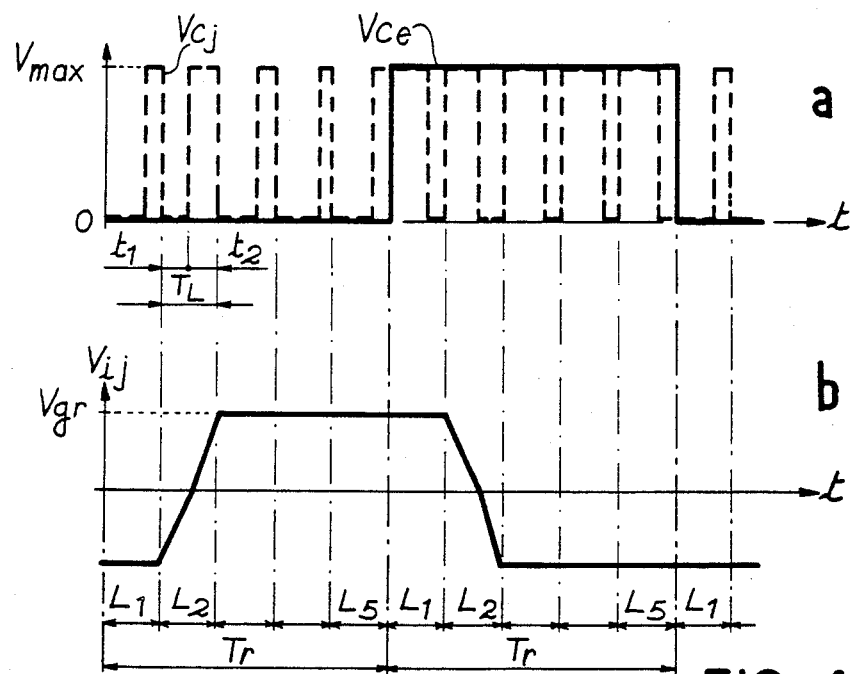
FIG. 4, already described, a second known variant for the control of gray levels.

Circuit 40 supplying the single signal in FIG. 1 can comprise a triangular signal generator dependent on the row frequency of the sync signal (video).

In the embodiments described, the polarity alternation of the control voltage takes place after each frame. This alternation can also take place after each row. This is illustrated in FIG. 14, where part a shows the signal applied to the input of all the column control circuits and part b the voltage applied to the counterelectrode.

What is claimed is:

1. An active matrix display screen comprising a first wall on which are deposited a matrix of N by P electrodes forming the first plates of capacitors, N addressing columns and P addressing rows, NP control transistors each having a drain (D), a gate (G) and a source (S), the drain (D) of each transistor being connected to the plate of one of the capacitors, the source to one of the columns and the gate to one of the rows; a second wall on which is deposited a counterelectrode forming the second plate of the capacitors; a first control circuit able to successively apply to the N rows a voltage Ve able to make the transistors of each row on for a time $T_L$, the control of the N rows constituting a frame of duration $Tr = NT_L$; a second control circuit able to apply to the counterelectrode a voltage Vce successively assuming two values, namely a value 0 and and a value Vc, the voltage Vce passing from one to the other of these values either following each frame, or following each row; and a third control circuit able to apply to the P columns for the entire control time of a row, a set of P voltages, said screen being characterized in that the third control circuit comprises a circuit supplying a voltage Vcb having a pedestal of duration $t_1$ of value equal to the voltage Vce applied to the counterelectrode and for a duration $t_2$ a ramp-like voltage passing linearly from said voltage Vce to a voltage differing from Vce by a quantity Vc, the total duration $t_1 + t_2$ of the voltage Vcb being equal to the control time $T_L$ of a row; and secondary column control circuits connected between said third control circuit and each column and which transmit to each column said voltage Vcb for a time which can assume a series of discrete values between $t_1$, in which case a black display is obtained, and $T_L$ in which case a white display is obtained, each intermediate discrete value between $t_1$ and $T_L$ corresponding to a gray display.

2. A display screen according to claim 1, wherein the third control circuit is constituted by P transistors having a source connected to the circuit supplying the voltage Vcb, a drain connected to one of the P columns and an gate connected to a operating circuit able to supply a voltage for controlling the turning on of the transistor for a time which is a function of the gray level to be displayed.

3. A display screen according to claim 2 wherein said operating circuit is able to supply a voltage for controlling the turning on of P transistors is constituted by P shift registers having n cells each, the first cell of each register being connected to the gate of one of the transistor, each register containing n bits, whereof the first is always equal to 1 and the following bits to 0 or 1, all these n bits characterizing a gray level, said registers being controlled by a common clock of period $t_1$, which is equal to said pedestal duration and which control the shift of the bits into each register, the duration $t_1$ being such that $nt_1$ is equal to the total row control duration $T_L$.

* * * * *